March 14, 1967 G. H. SHRIVER 3,308,929

MATERIAL HANDLING APPARATUS

Filed Oct. 11, 1965

*INVENTOR.*
G. H. SHRIVER

3,308,929
MATERIAL HANDLING APPARATUS
George H. Shriver, Moline, Ill., assignor to Deere & Company, Moline, Ill., a corporation of Delaware
Filed Oct. 11, 1965, Ser. No. 494,586
4 Claims. (Cl. 198—202)

This invention relates to a belt-type conveyor and more particularly to a belt-type conveyor having an improved roller for keeping the belt running true.

Maintaining a belt in a centered position on its roller or pulleys has long been a problem when using belt-type conveyors. For example, in the agricultural machinery field wherein belt-type conveyors are used in numerous crop-handling applications, the tracking of the belts has presented many problems, especially in non-level operation of the belt, such as on windrow-type harvesters. Many belt-type conveyors utilize guides on opposite sides of the belt to keep the belt running true. However, this has resulted in wear on the belt edges. It is also known to utilize rollers having a central portion of greater diameter than the end portions, creating a greater belt tension at the center of the belt and also creating lateral forces on the belt which tend to center the belt. Such rollers generally taper to their larger diameter at the center, forming a V-shaped crown, although rollers having a cylindrical central portion are also known. However, the increased tension on the central portion of the belt has increased the belt wear at this point and the lesser tension at the opposite sides of the belt has resulted in lesser surface friction between the belt and the roller. Other relatively complicated configurations of rollers have been proposed to keep the rollers running true, such as rollers with resilient faces, rollers with non-parallel roller sections forming a U-shaped roller, or rollers with a large number of resilient circumferential ribs. However, such rollers are all relatively expensive to manufacture and maintain.

An object of the present invention is to provide novel rollers for a belt-type conveyor to keep the belt running true.

Another object is to provide such rollers with a plurality of circumferential ribs and more specifically to provide such a roller with a pair of relatively thin, narrow, circumferential ribs proximate to the opposite ends of the roller, and further to provide such ribs having a substantially rectangular cross section.

Still another object is to provide such rollers which are simple and inexpensive to manufacture and having ribs which are simple to produce, easily attached to conventional cylindrical-type rollers, or mounted on rollers already in use.

These and other objects will become apparent from the following detailed description and accompanying drawings wherein.

Figure 1:
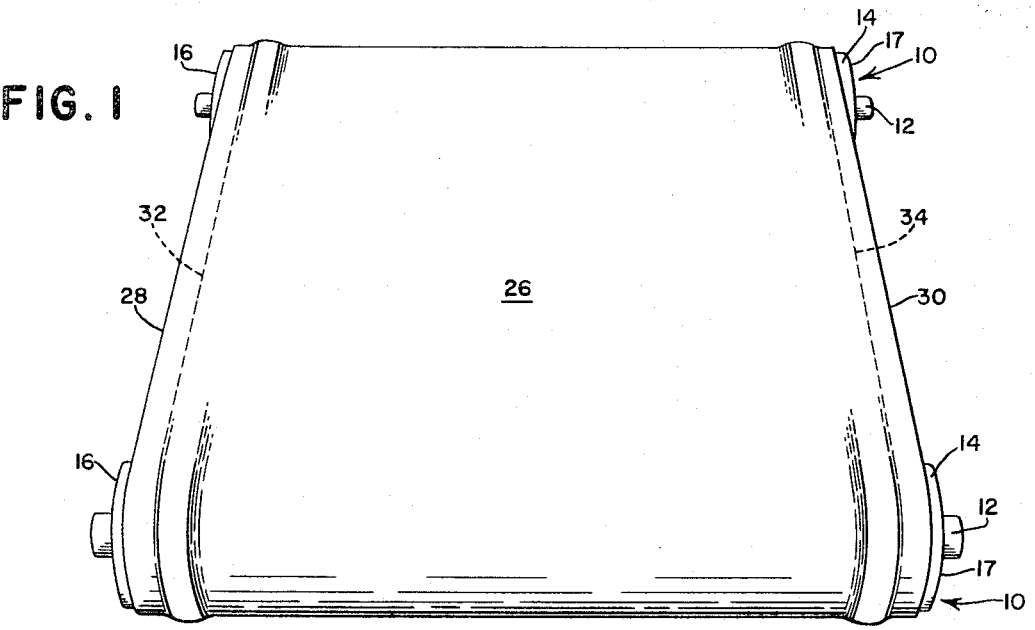
FIG. 1 is a perspective view of a belt-type conveyor utilizing the novel rollers.
Figure 2:
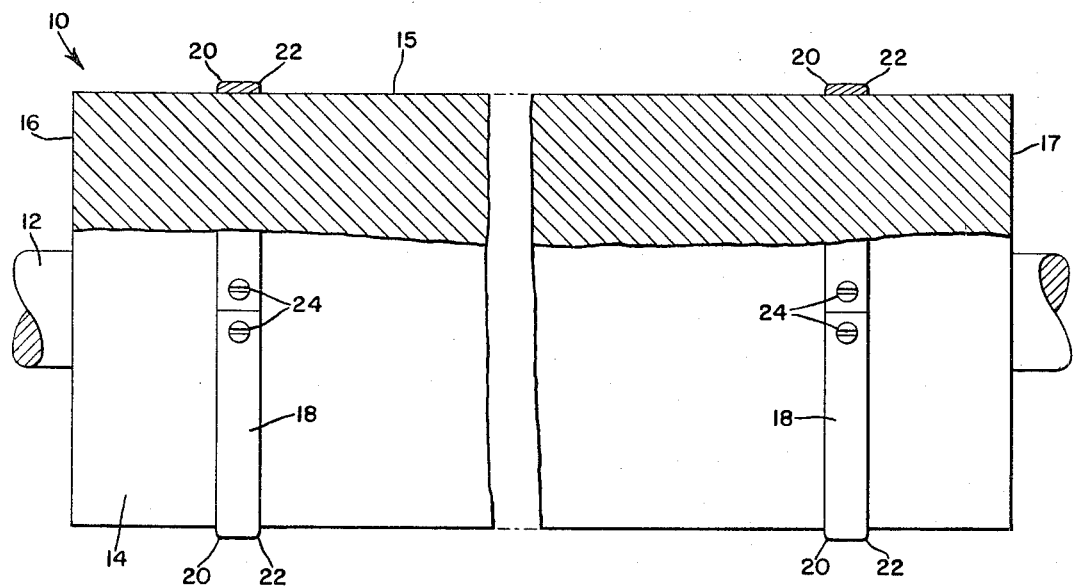
FIG. 2 is an enlarged longitudinal elevation view of the roller, partly in section, and with the central portion of the roller removed.

A typical belt-type conveyor utilizing a pair of the novel rollers is shown in FIG. 1. It is to be understood that the particular conveyor shown is for the purpose of illustration only and that the novel roller can be utilized on various conveyor configurations. Moreover, various sizes of rollers could be utilized, and it is not necessary that all the rollers in the conveyor be constructed according to the invention, although it is preferable that the drive roller and any roller which has substantial contact with the belt, such as an end roller, have the novel roller construction.

The conveyor includes a pair of spaced parallel rollers or pulleys indicated generally by the numeral 10, each roller 10 including an axial shaft 12 and a cylindrical roller body 14 having a relatively smooth outer periphery 15 and opposite ends 16 and 17. Each roller also has a pair of axially spaced circumferential ribs or rings 18 respectively proximate to the opposite ends 16 and 17. The ribs 18 have substantially rectangular cross sections with slightly rounded outer corners 20 and 22, the relatively small corner radius found on commercially available stock being satisfactory. The radial and axial dimensions of each rib cross section are a relatively small percent of the radial and axial dimensions of the roller body 14.

The ribs 18 are preferably made of commercial rolled metal stock, formed around the periphery 15 of the body 14 and fastened thereto by a plurality of fasteners 24, although other methods, such as welding, could be utilized to secure the ribs on the body. Moreover, the ribs could be an integral part of the roller body 14 and formed by a machining operation.

An endless flexible belt 26 is trained around the rollers 10, the outer periphery 15 of the roller body 14 and the outer surface of the ribs 18 engaging the inner surface of the belt 26, the ribs 18 respectively engaging the belt proximate to the opposite belt edges 28 and 30. The belt is sufficiently flexible and resilient to stretch at each rib 18 and also engage the outer periphery of the roller body 14 closely adjacent to both sides of each rib 18, the ribs being spaced a sufficient distance from the belt edges 28 and 30 to permit the edges to engage the roller 10.

In operation, as the belt 26 moves around the rollers 10, the edges 20 and 22 dig into the inner surface of the belt 26, preventing the lateral shifting of the belt on the roller. The stretching of the belt 26 at the ribs 18 also creates lateral forces on the belt which are in balance as long as the belt runs true and which tend to return the belt to its centered position should the belt shift laterally.

As previously pointed out, the ribs have a relatively small radial and axial dimension, so that the ribs do not substantially distort the belt or reduce the contact area between the belt and the roller, and also have slightly rounded corners 20 and 22 which prevent the corners from cutting the belt.

For example, it has been found that in a conveyor having a 42-inch belt trained around a pair of eight-inch diameter rollers, ribs 18 having a $3/16$ inch radial dimension and a $3/4$ inch axial dimension, have maintained the belt 26 on the rollers 10, even when the conveyor was operated on its side. Commercial stock of the above-described dimension was found to have approximately $3/32$ inch radius on the corners and proved satisfactory, although more rounded ribs did not function as well. Moreover, it was found that such a roller performed well with both single and double ply belts, the single ply belt having hems along opposite edges, such as indicated by the numerals 32 and 34 in FIG. 1. In such a belt, each rib 18 engages the belt adjacent to and inside the edges of the hems to further impede lateral shifting of the belt.

It is to be understood that the above dimensions are not to be construed as limiting parameter and are set forth only to illustrate the approximate relative sizes of the ribs and the rollers. Moreover, other features and advantages of the present invention will readily occur to those skilled in the art, as will many modifications and alterations in the preferred embodiment of the invention described herein, all of which may be achieved without departing from the spirit and the scope of the invention.

What is claimed is:

1. A belt-type conveyor comprising: a plurality of substantially cylindrical rollers, at least one of said rollers having a pair of axially spaced circumferential ribs on its outer periphery, each rib having a substantially rectangular cross section with an axial dimension less than 10% of the axial dimension of the roller and a radial dimension less than 10% of the diameter of the roller; and an endless, flexible belt trained around the rollers, the ribs operatively engaging a surface of the belt to keep the belt running true.

2. The invention defined in claim 1 wherein the rollers are axially elongated and the ribs respectively engage the belt surface proximate to the opposite belt edges.

3. The invention defined in claim 2 wherein the ribs are of non-resilient material.

4. A roller for an endless belt-type conveyor comprising: a substantially cylindrical roller body; and a pair of axially spaced circumferential ribs attached to the outer periphery of the roller body, each rib having a substantially rectangular cross section with an axial dimension less than 10% of the axial dimension of said roller and a radial dimension less than 10% of the diameter of said roller.

References Cited by the Examiner

UNITED STATES PATENTS

| 502,041 | 7/1893 | Jacoby | 198—202 X |
| 636,941 | 11/1899 | Barron | 198—202 X |
| 3,018,935 | 1/1962 | Maddock | 226—193 X |

FOREIGN PATENTS 157,267  12/1963  U.S.S.R.

EVON C. BLUNK, *Primary Examiner.*

EDWARD A. SROKA, *Examiner.*